United States Patent
Reminick et al.

(10) Patent No.: US 10,140,594 B2
(45) Date of Patent: Nov. 27, 2018

(54) MULTI-PROGRAM SCHEDULING PLATFORM WITH PRIORITY TIERS

(71) Applicant: SJ MedConnect, Inc., Santa Clara, CA (US)

(72) Inventors: Jason Reminick, Santa Clara, CA (US); Suzanne Karan, Rochester, NY (US)

(73) Assignee: SJ MedConnect, Inc., Santa Clara, CA (US)

( * ) Notice: Subject to any disclaimer, the term of this patent is extended or adjusted under 35 U.S.C. 154(b) by 369 days.

(21) Appl. No.: 14/669,312

(22) Filed: Mar. 26, 2015

(65) Prior Publication Data

US 2016/0283910 A1    Sep. 29, 2016

(51) Int. Cl.
 *G06Q 10/10*    (2012.01)
(52) U.S. Cl.
 CPC ................... *G06Q 10/1095* (2013.01)
(58) Field of Classification Search
 CPC ................................... G06Q 10/1095
 See application file for complete search history.

(56) References Cited

U.S. PATENT DOCUMENTS

| | | | | |
|---|---|---|---|---|
| 6,978,246 B1* | 12/2005 | Ruvolo | ............... | G06Q 10/109 705/7.19 |
| 8,266,068 B1* | 9/2012 | Foss | ............... | G06Q 10/06 705/321 |
| 8,548,929 B1* | 10/2013 | Goodwin | ............... | G06Q 10/06 705/320 |
| 8,572,000 B1* | 10/2013 | Weingarten | ............ | G06Q 10/00 705/320 |
| 2008/0040188 A1* | 2/2008 | Klausmeier | .......... | G06Q 10/109 705/7.18 |
| 2008/0294627 A1* | 11/2008 | Wadsworth | ........... | G06Q 10/06 |
| 2009/0006161 A1* | 1/2009 | Chen | ............... | G06Q 10/1095 705/7.19 |
| 2009/0106067 A1* | 4/2009 | Mann | ............... | G06Q 10/06 705/7.18 |
| 2009/0228323 A1* | 9/2009 | Ebrahimian | ........... | G06Q 10/06 705/321 |
| 2011/0276507 A1* | 11/2011 | O'Malley | ............. | G06Q 10/00 705/321 |
| 2012/0023083 A1* | 1/2012 | McCagg | ................ | G06Q 10/10 707/706 |
| 2012/0239585 A1* | 9/2012 | Bailey | ............... | G06Q 10/0631 705/321 |
| 2012/0271675 A1* | 10/2012 | Christensen | ....... | G06Q 10/1053 705/7.14 |

(Continued)

*Primary Examiner* — Sujay Koneru

(57) ABSTRACT

A system and method for scheduling a plurality of event programs, including: for each event program, generating a program calendar that enables a corresponding program administrator to assign a priority tier to each of a set of event slots in the corresponding event program; for each event program, generating an administrator dashboard that enables the corresponding program administrator to assign a priority tier to each of a set of schedulees for the corresponding event program; and for each schedulee, generating a schedulee calendar that enables the corresponding schedulee to schedule only the event slots assigned a priority tier that match to the priority tier assigned to the corresponding schedulee.

14 Claims, 14 Drawing Sheets

(56) References Cited

U.S. PATENT DOCUMENTS

| | | | |
|---|---|---|---|
| 2013/0097093 A1* | 4/2013 | Kolber | G06Q 10/1053 705/321 |
| 2013/0151637 A1* | 6/2013 | Bedikian | H04L 67/22 709/206 |
| 2014/0019585 A1* | 1/2014 | Vishnubhatla | H04L 67/06 709/217 |
| 2014/0122152 A1* | 5/2014 | Lee | G06Q 10/1095 705/7.19 |
| 2014/0278464 A1* | 9/2014 | Davis | G06F 19/3418 705/2 |
| 2014/0278683 A1* | 9/2014 | Kennell | G06Q 10/1053 705/7.19 |
| 2015/0242815 A1* | 8/2015 | Velasco | H04W 4/21 705/321 |
| 2015/0269528 A1* | 9/2015 | Gharote | G06Q 10/1053 705/321 |
| 2015/0324755 A1* | 11/2015 | Bathiya | G06Q 10/109 705/7.19 |
| 2015/0373387 A1* | 12/2015 | Chaar | H04N 21/26208 725/35 |
| 2016/0086273 A1* | 3/2016 | Rice | G06Q 40/04 705/26.3 |
| 2016/0171452 A1* | 6/2016 | Brown | G06Q 10/1095 705/7.19 |

\* cited by examiner

Change Table Columns

☑ First Name
☐ M.I.
☑ Last Name
☐ Email
☑ Gender
☐ Application Status
☐ Interview Status
☑ Tier
☐ Action Status
☑ Invited
☑ Scheduled
☑ Interview Date
☑ Interviewed
☑ Score
☑ Rank
☐ AAMC ID
☐ USMLE Step 1
☐ USMLE Step 2 CK
☐ USMLE Step 3
☐ ITE
☐ COMLEX 1
☐ COMLEX 2 CE
☐ AOA
☐ Medical School
☐ Internship Program
☐ Residency Program
☐ Internship Specialty
☐ Residency Specialty
☐ Medical License State
☐ Medical License Number
☐ Age
☐ Citizenship
☐ Account

Fig. 5

Schedulee Calendar 1

February 2015

| Sun | Mon | Tue | Wed | Thu | Fri | Sat |
|---|---|---|---|---|---|---|
| 1 | 2 | 3 | 4 | 5 | 6 | 7 |
| 8 | 9 | 10 | 11<br>7a NYU Medical School Anesthesiology Interview Day | 12<br>8a Loyola University Anesthesiology Interview Day | 13<br>9a Univ. of Rochester Anesthesiology Interview Day | 14 |
| 15 | 16 | 17 | 18<br>7a NYU Medical School Anesthesiology Interview Day | 19<br>8a Loyola University Anesthesiology Interview Day | 20<br>9a Univ. of Rochester Anesthesiology Interview Day | 21 |
| 22 | 23 | 24 | 25 | 26 | 27 | 28 |
| | | | | | | |

Today  < >

710 → Profile / Calendar / Rank List / User Guide

Event Details - 2-11-2015

Applicants Signed Up

| Tier I | | Tier II | | Tier III | |
|---|---|---|---|---|---|
| None | | John Thalamus | | None | |

Distribution

Applicants Signed Up By Tier

Tier I:
Tier II: 1
Tier III:

Applicants Signed Up By Gender

Male: 1
Female:

Total Applicants Signed Up

Total: 1

Fig. 9

Thalamus Program I Anesthesiology - Selected Applicants

Sally Amygdala

| | | | |
|---|---|---|---|
| AAMC ID | 30000000 | AOA | No |
| Gender | F | USMLE Step 1 | 210 |
| Age | 30 | USMLE Step 2 CK | 225 |
| Email | SallyA@mail.com | COMLEX 1 | 669 |
| Citizenship | U.S. Citizen | COMLEX 2 CE | 731 |
| Account | Yes | Tier | II |
| Hobbies and Interests | - | Invited | 2/19/2015 |
| Medical School | Nova Southwestern University College of Osteopathic Medicine | Scheduled | No |
| | | Interview Date | N/A |
| | | Interviewed | No |

Notes

Sally Amygdala Photo

Rank: -
Score: -

Mark Cerebellum

| | | | |
|---|---|---|---|
| AAMC ID | 80000000 | AOA | No |
| Gender | M | USMLE Step 1 | 220 |
| Age | 30 | USMLE Step 2 CK | 210 |
| Email | MarkC@mail.com | COMLEX 1 | 0 |
| Citizenship | U.S. Citizen | COMLEX 2 CE | 0 |
| Account | Yes | Tier | I |
| Hobbies and Interests | - | Invited | 2/19/2015 |
| Medical School | George Washington University School of Medicine and Health Services | Scheduled | No |
| | | Interview Date | N/A |
| | | Interviewed | No |

Notes

Mark Cerebellum Photo

Rank: -
Score: -

Fig. 12

MULTI-PROGRAM SCHEDULING PLATFORM WITH PRIORITY TIERS

BACKGROUND

Organizations, e.g., schools, businesses, government agencies, etc., can hold event programs that can be scheduled by interested individuals. For example, a professional school can hold an interview program for interviewing applicants to the professional school. Similarly, a businesses or other type of institution can hold an interview program for interviewing job applicants. Interested individuals can schedule an event program by communicating directly with the organization holding the event program. For example, professional school applicants can schedule interview slots in an interview program held by a professional school by communicating directly with the professional school. An interested individual can schedule with a number of a similar event programs. For example, medical students applying for residency positions can schedule interview slots in a number of interview programs held by a number of different residency programs in their specialty of choice by communicating directly with each residency program in the affiliated institution.

SUMMARY

In general, in one aspect, the invention relates to a platform for scheduling a plurality of event programs. The platform can include: a program calendar module that generates a program calendar for each event program, each program calendar enabling a corresponding program administrator to assign a priority tier to each of a set of event slots in the corresponding event program; a dashboard module that generates an administrator dashboard for each event program, each administrator dashboard enabling the corresponding program administrator to assign a priority tier to each of a set of schedulees for the corresponding event program; and a schedulee calendar module that generates a schedulee calendar for each schedulee, each schedulee calendar allowing the corresponding schedulee to schedule only the event slots assigned a priority tier that matches to the priority tier assigned to the corresponding schedulee.

In general, in another aspect, the invention relates to a method for scheduling a plurality of event programs. The method can include: for each event program, generating a program calendar that enables a corresponding program administrator to assign a priority tier to each of a set of event slots in the corresponding event program; for each event program, generating an administrator dashboard that enables the corresponding program administrator to assign a priority tier to each of a set of schedulees for the corresponding event program; and for each schedulee, generating a schedulee calendar that enables the corresponding schedulee to schedule only the event slots assigned a priority tier that match to the priority tier assigned to the corresponding schedulee.

Other aspects of the invention will be apparent from the following description and the appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

FIG. 5 shows a popup menu that enables a program administrator to select which of a set of parameters for a schedulee are to appear in a current table view.

FIG. 7 illustrates a schedulee calendar in one or more embodiments.

FIG. 8 shows an updated program calendar in response to a schedulee confirmed status from a schedulee calendar.

FIG. 9 shows a view displayed when a program administrator selects "View Details" in a popup view for a scheduled event.

FIG. 12 illustrates a print function available to a program administrator via the actions button in an administrator dashboard.

DETAILED DESCRIPTION

Figure 1:
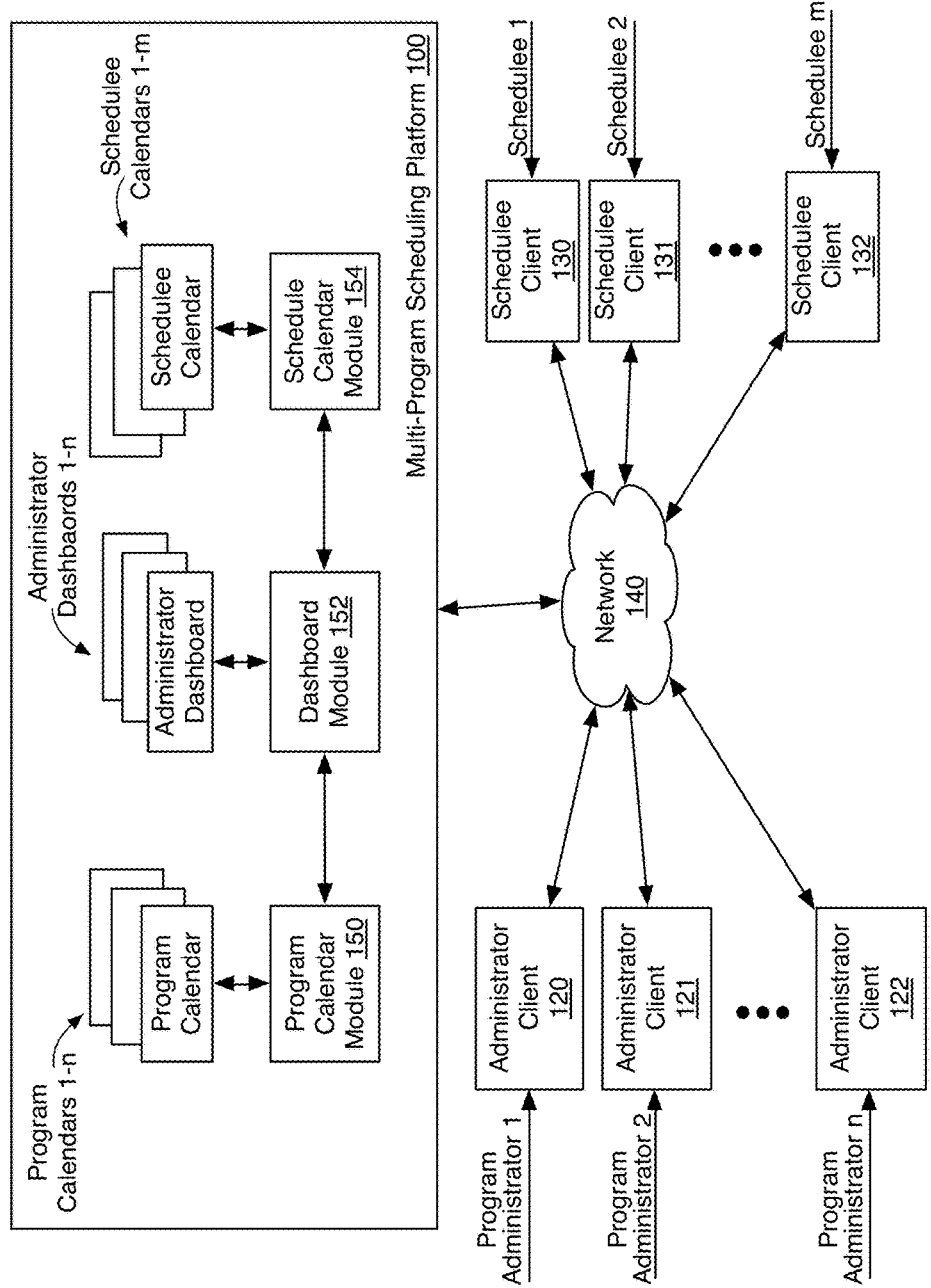
FIG. 1 shows a multi-program scheduling platform in one or more embodiments.

Reference will now be made in detail to the various embodiments of the present disclosure, examples of which are illustrated in the accompanying drawings. Like elements in the various figures are denoted by like reference numerals for consistency. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, have not been described in detail so as not to unnecessarily obscure aspects of the present disclosure.

FIG. 1 shows a multi-program scheduling platform 100 in one or more embodiments. The multi-program scheduling platform 100 enables scheduling of multiple event programs. Each event program can be administered by a respective program administrator 1-$n$. Event programs can be scheduled by a set of schedulees 1-$m$. The program administrators 1-$n$ and the schedulees 1-$m$ access the multi-program scheduling platform 100 via a network 140 using respective administrator clients 120-122 and schedulee clients 130-132.

Each event program can include a set of event slots. One or more of the schedulees 1-*m* may seek to schedule event slots in more than one event program. The event programs can be similar programs associated with different institutions. The event programs can be held at times of the year that coincide with traditional operations of institutions, e.g. the traditional school year for educational institutions or fiscal years for government or business institutions. In one embodiment, the event programs are interview days offered by different residency programs and the schedulees 1-*m* are fourth-year medical students seeking residency positions.

The multi-program scheduling platform 100 includes a program calendar module 150 that generates a respective program calendar 1-*n* for each event program. The program calendars 1-*n* enable the respective program administrators 1-*n* to assign a priority tier to each of a set of event slots in their event program. For example, the program calendar 1 enables the program administrator 1 to assign a priority tier to each event slots in the event program administered by the program administrator 1.

The multi-program scheduling platform 100 includes a dashboard module 152 that generates a respective administrator dashboard 1-*n* for each event program. The administrator dashboards 1-*n* enable the respective program administrators 1-*n* to assign a priority tier to each of the schedulees 1-*m* for the corresponding event program. For example, the administrator dashboard 1 enables the program administrator 1 to assign a priority tier to each of the schedulees 1-*m* who has been selected for the event program presided over by the program administer 1.

The multi-program scheduling platform 100 includes a schedulee calendar module 154 that generates a respective schedulee calendar 1-*m* for each of the schedulees 1-*m*. Each schedulee calendar 1-*m* allows the corresponding schedulee 1-*m* to schedule only the event slots assigned a priority tier that matches the priority tier assigned to the corresponding schedulee 1-*m*. For example, the schedulee calendar 1 allows the schedulee 1 to schedule only the event slots assigned a priority tier that matches to the priority tier assigned to the schedulee 1. Similarly, the schedulee calendar 2 allows the schedulee 2 to schedule only the event slots assigned a priority tier that matches to the priority tier assigned to the schedulee 2.

In one or more embodiments, the program calendars 1-*n* and the administrator dashboards 1-*n* enable the program administrators 1-*n* to select the priority tiers for the event slots and for the schedulees 1-*m* from among a predetermined set of priority tiers. In one or more embodiments, the predetermined set of priority tiers can include a priority tier I, a priority tier II, and a priority tier III. An event slot assigned to the priority tier I can be refereed to as a Tier I event slot. Similarly, event slots assigned to the priority tiers II and III can be refereed to as Tier II and Tier III event slots, respectively. Likewise, schedulees assigned to the priority tiers I, II, and III can be refereed to as a Tier I schedulees, Tier II schedulees, and Tier III schedulees, respectively. In one or more embodiments, the schedulee calendars 1-*m* allow Tier I schedulees to schedule Tier I, II, and III event slots, and allow Tier II schedulees to schedule only Tier II and Tier III event slots, and allow Tier III schedulees to schedule only Tier III event slots.

In one or more embodiments, the program calendars 1-*n* and the administrator dashboards 1-*n* enable the program administrators 1-*n* assign an Exclusive Tier to the event slots and the schedulees 1-*m*. The program calendars 1-*m* allow only the schedulees 1-*m* assigned to the Exclusive Tier to schedule the events slots assigned to the Exclusive Tier. The Exclusive Tier can enable the program administrators 1-*n* to assign a special status to schedulees. For example, the administrator of a residency program can assign a "Combined Pediatric Anesthesia" status to particular applicants for their combined residency program so that only the applicants with the special combined status will be allowed to sign up for the special "Combined" event slots while other "regular" anesthesia applicants will not.

The program calendars 1-*n* and the administrator dashboards 1-*n* and the schedulee calendars 1-*m* can be implemented as web pages on the multi-program scheduling platform 100. The administrator clients 120-122 and the schedulee clients 130-132 can run respective web browser application programs that enable the respective program administrators 1-*n* and schedulees 1-*m* to log into the multi-program scheduling platform 100 and access their respective program calendars 1-*n* and administrator dashboards 1-*n* and schedulee calendars 1-*m*. Any one or more of the administrator clients 120-122 or the schedulee clients 130-132 can be a mobile device that runs a mobile app adapted to a mobile operating system and adapted to access the respective program calendars 1-*n* and administrator dashboards 1-*n* and schedulee calendars 1-*m* of the multi-program scheduling platform 100.

Figure 2:
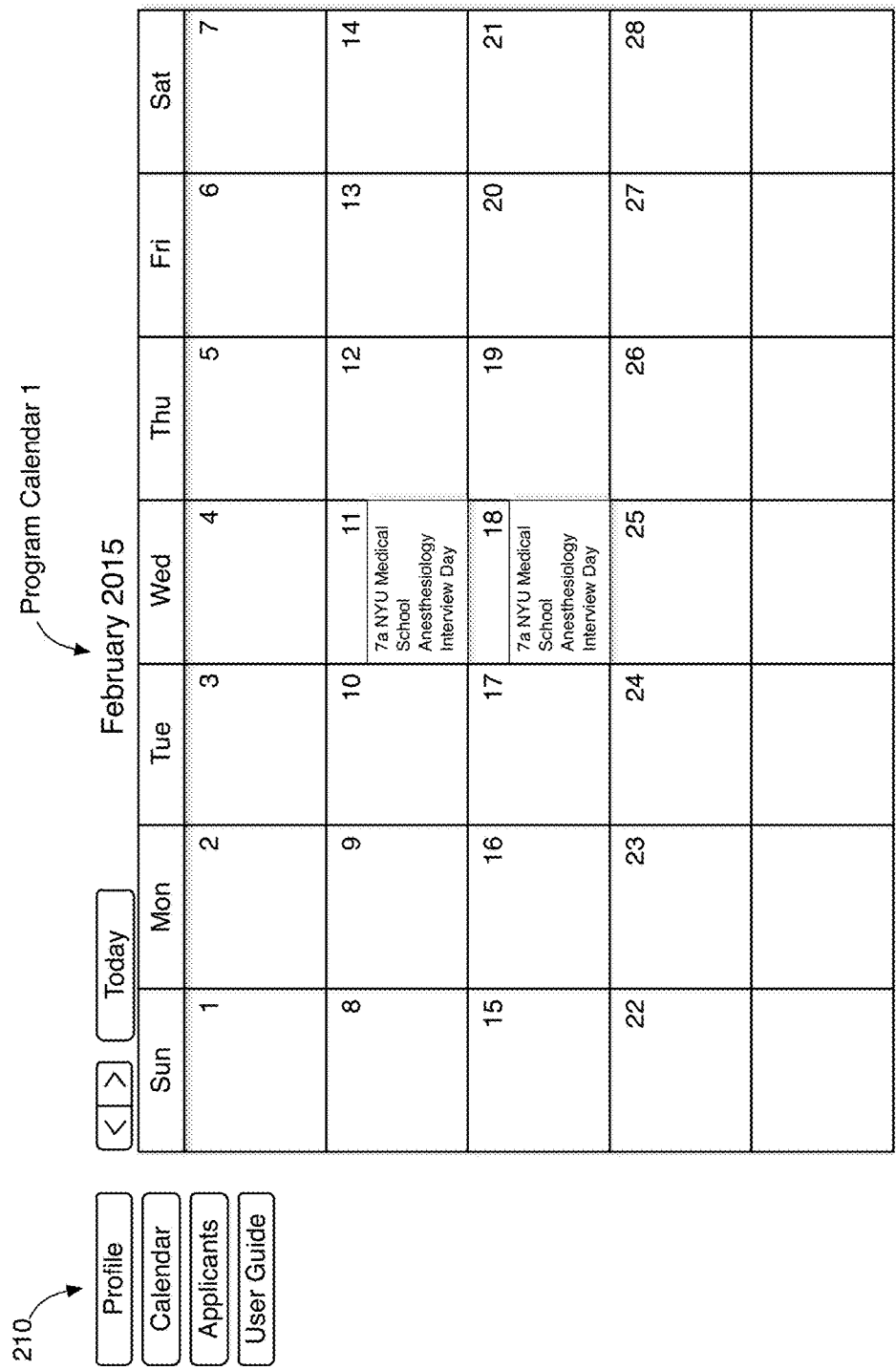
FIG. 2 illustrates a program calendar in one or more embodiments.

FIG. 2 illustrates the program calendar 1 in one or more embodiments. The program calendars 2-*n* may be implemented in a substantially similar manner. The program administrator 1 can navigate to the program calendar 1 by selecting a "Calendar" button in a navigation pane 210. The navigation pane 210 can be displayed on the administrator client 120 in the login account of the program administrator 1 on the multi-program scheduling platform 100. If the administrator client 120 is, e.g., a desktop or laptop computer, then the program administrator 1 can use a pointing device, e.g., a mouse, to select the buttons in the navigation pane 210. If the administrator client 120 is a mobile device then the program administrator 1 may touch select buttons in the navigation pane 210 via a touchscreen interface to navigate to the program calendar 1.

The event program corresponding to the program calendar 1 in this example is an interview program for selecting applicants to the NYU Medical School Anesthesiology residency program. The program administrator 1 who administers the scheduling of candidates for the NYU residency program has created two events in the program calendar 1—events on the 11th and 18th of February 2015. The program administrator 1 can create events in the program calendar 1 by selecting, e.g., clicking or touching, the desired day in the program calendar 1 rendered on the administrator client 120.

Figure 3:
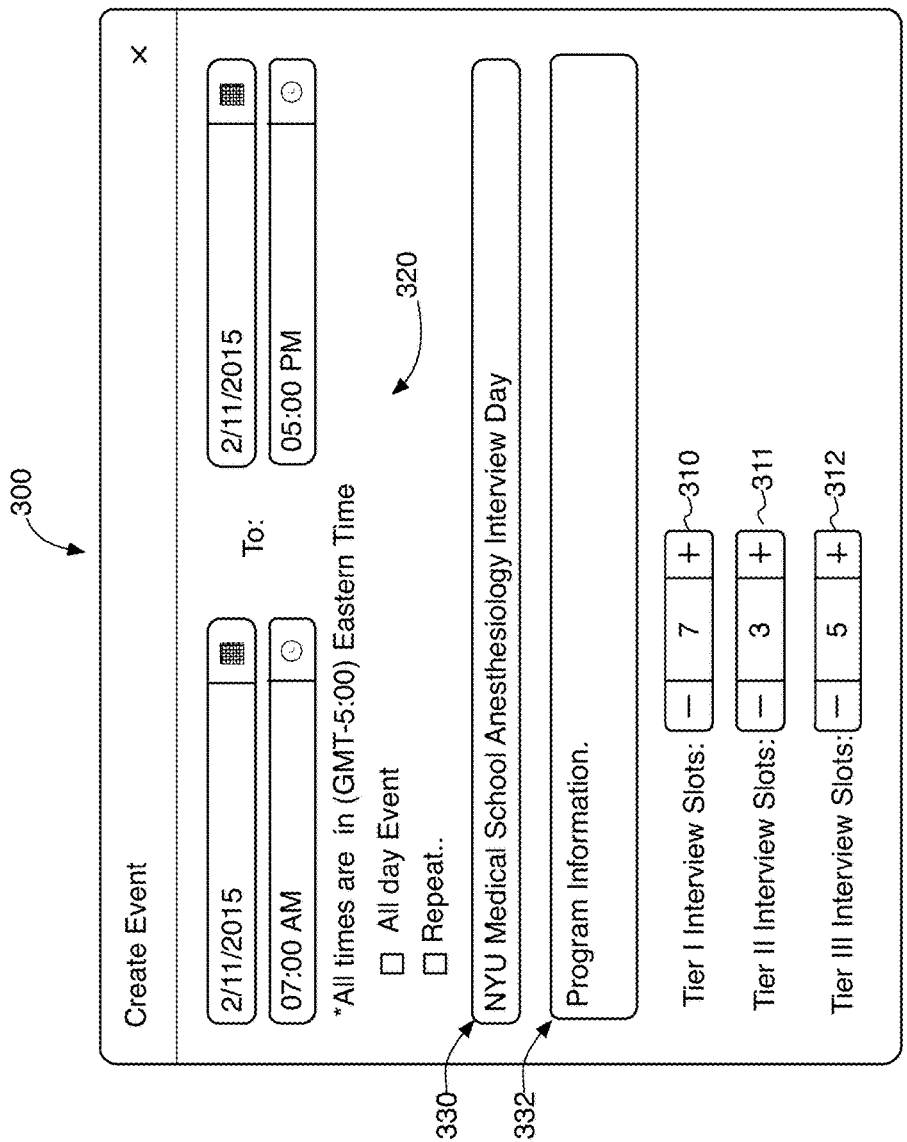
FIG. 3 shows a user interface displayed on an administrator client that enables a program administrator to create an event in a program calendar.

FIG. 3 shows a user interface 300 in one or more embodiments that enables the program administrator 1 to create an event in the program calendar 1. In this example, the event is the NYU residency program interview day on 2/11/2015. The user interface 300 can be a window that pops up in a web browser in response to the program administrator 1 selecting the area of the program calendar 1 corresponding to 2/11/2015. The user interface 300 can be a segue view on a mobile device.

The user interface 300 includes a set of interface elements 320 that enable the program administrator 1 to select a date and time for the corresponding event. The user interface 300 includes an input field 330 that enables the program administrator 1 to enter a title for the corresponding event and an input field 332 that enables the program administrator 1 to enter program information associated with the corresponding event.

The user interface 300 includes a set of rocker switch interface elements 310-312 that enable the program administrator 1 to specify a number of event slots in the corresponding event for each of a set of predetermined priority tiers—a Tier I, a Tier II, and a Tier III (roman numerals). For example, the interface element 310 enables the program administrator 1 to specify the number of Tier I slots for the corresponding event. The interface element 310 includes a "+" button that when selected by the program administrator 1 increments the number of Tier I slots and a "−" button that when selected decrements the number of Tier I slots. Similarly, the interface elements 311 and 312 enable the program administrator 1 to specify the number of Tier II and Tier III slots, respectively, for the corresponding event. In this example, the program administrator 1 specifies 7 Tier I Interview Slots, 3 Tier II Interview Slots, and 5 Tier III Interview Slots for the NYU residency program interview day of 2/11/2015.

Figure 4:
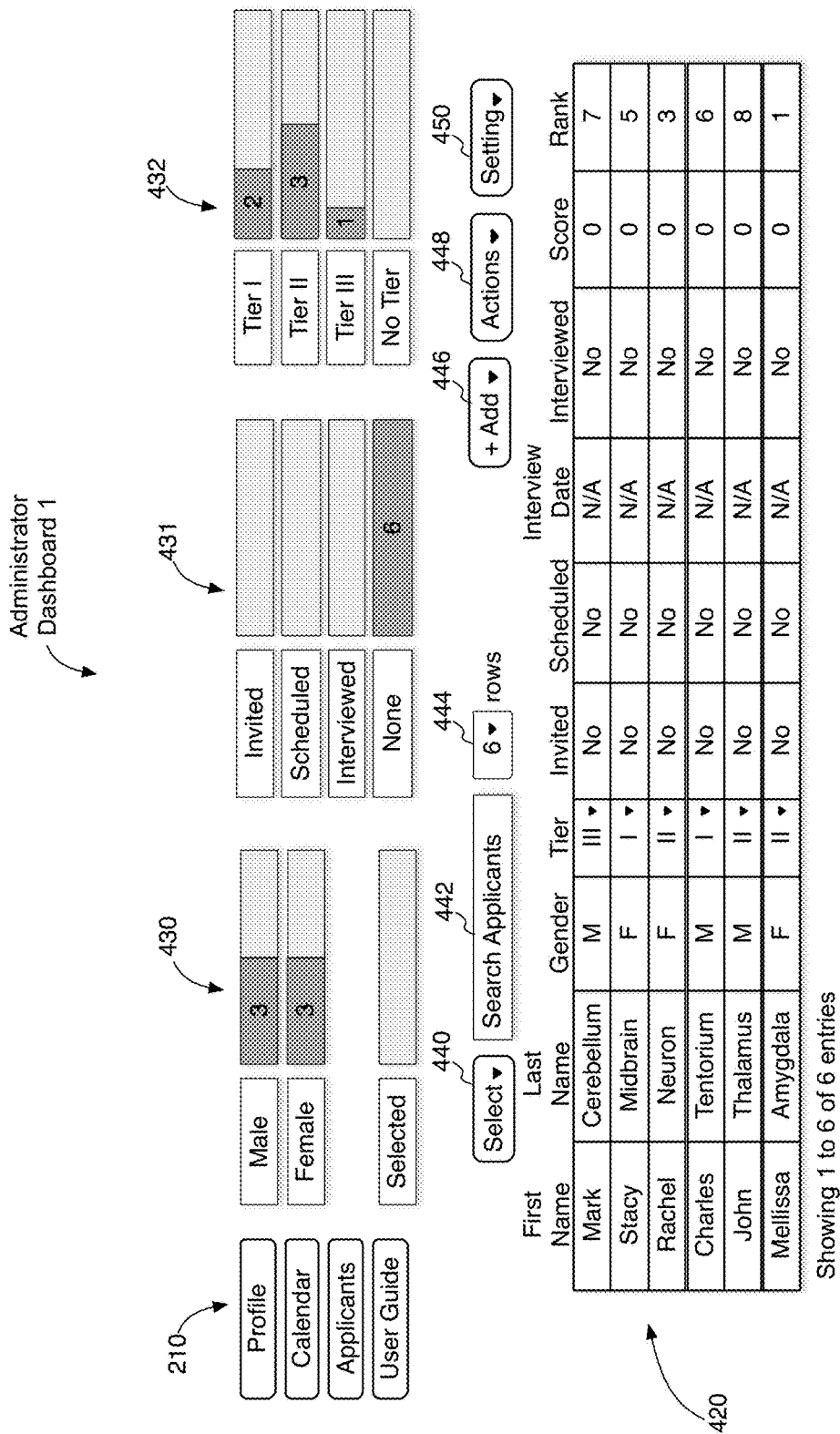
FIG. 4 illustrates an administrator dashboard in one or more embodiments.

FIG. 4 illustrates the administrator dashboard 1 in one or more embodiments. The administrator dashboards 2-$n$ may be implemented in a substantially similar manner. The program administrator 1 can navigate to the administrator dashboard 1 by selecting an "Applicants" button in the navigation pane 210.

The administrator dashboard 1 includes a table 420 that enables the program administrator 1 to organize and manipulate information pertaining to the schedulees 1-$m$ who have been selected for the event program presided over by the program administrator 1. The administrator dashboard 1 includes sets of bar graphs 430-432 that provide the program administrator 1 with a graphical view of the information contained in the table 420.

Each row of the table 420 holds a set of parameters associated with the corresponding schedulee 1-$m$. The administrator dashboard 1 includes a settings button 450 with a popup menu that enables the program administrator 1 to select, e.g., via checkboxes, which of a set of possible parameters for a schedulee are to appear in the current view of the table 420. In this example, the parameters selected via the settings button 450 include first and last name, gender, a priority tier, an indication of whether the corresponding schedulee 1-$m$ has been invited to schedule, an indication of whether the corresponding schedulee 1-$m$ has already scheduled, an interview date (if applicable), a score, and a rank.

FIG. 5 shows a popup menu 500 that enables the program administrator 1 to select, e.g., via respective checkboxes, which of a set of parameters for a schedulee are to appear in the current view of the table 420 in one or more embodiments. The program administrator 1 can check any of the boxes in the popup menu 500 and then view, sort, and select the schedulees in the table 420 based on the selected information.

Referring back to FIG. 4, the administrator dashboard 1 in one or more embodiments includes a search field 442 that enables the program administrator 1 to search the table 420 by name or by any other parameter. The administrator dashboard 1 in one or more embodiments includes a button 444 with a popup menu that enables the program administrator 1 to specify the number of rows to appear in the current view of the table 420.

In one or more embodiments, the program administrator 1 can initialize the information in the table 420 by uploading a spreadsheet or other type of file into the multi-program scheduling platform 100 from the administrator client 120. The spreadsheet can contain names, genders, and other information pertaining the schedulees 1-$m$ that have been selected for the event program administered by the program administrator 1. In this example, the table 420 is initialized with the schedulees 1-$m$ who have been selected as applicants for the NYU residency program and the uploaded spreadsheet is derived from the Electronic Residency Application System (ERAS).

The administrator dashboard 1 in one or more embodiments includes an add button 446 with popup menu that enables the program administrator 1 to select an "Add Applicants" menu item or an "Upload Applicants" menu item. If the program administrator 1 selects Upload Applicants, the multi-program scheduling platform 100 generates a dialog box that enables the program administrator 1 to upload a spreadsheet or other file into the table 420 from the administrator client 120. If the program administrator 1 selects Add Applicants, the multi-program scheduling platform 100 adds an entry to the table 420 that the program administrator 1 can fill manually.

The table 420 in one or more embodiments provides a set of sort functions so that when the program administrator 1 selects a column heading, the rows of the table 420 automatically sort by the parameters in that column. For example, the program administrator 1 can select the "First Name" column heading to sort the rows of the table 420 by first name in alphabetical order. Selecting the "First Name" column heading again can sort in the reverse order. Similarly, the program administrator 1 can select the "Rank" column heading to sort the rows of the table 420 by rank in ascending order and then select the "Rank" column heading again to sort in descending order.

The administrator dashboard 1 in one or more embodiments includes a select button 440 with a popup menu that enables the program administrator 1 to select one or more rows of the table 420. The popup menu from the select button 440 in one or more embodiments includes an "All" menu item for selecting all of the rows in the table 420, a "None" menu item for deselecting all rows in the table 420, a "Tier I" menu item for selecting all of the rows in the table 420 that specify priority tier I in the Tier column, a "Tier II" menu item for selecting all of the rows in the table 420 that specify priority tier II in the Tier column, a "Tier III" menu item for selecting all of the rows in the table 420 that specify priority tier III in the Tier column, a "No Tier" menu item for selecting all of the rows in the table 420 that do not specify a priority tier in the Tier column, a "Male" menu item for selecting all of the rows in the table 420 that specify Male in the Gender column, and a "Female" menu item for selecting all of the rows in the table 420 that specify Female in the Gender column.

The popup menu from the select button 440 in other embodiments can include selection options based on any of the parameters in the table 420. The program administrator 1 can select rows in the table 420 manually, e.g., by click or touch.

After selecting one or more rows of the table 420, the program administrator 1 can perform a variety of actions on the selected rows of the table 420, in a batch mode, using an actions button 448 with popup menu. In one or more embodiments, the popup menu for the actions button 448 includes an "Assign Tier I" menu item, an "Assign Tier II" menu item, and an "Assign Tier III" menu item which cause all of the rows currently selected in the table 420 to be assigned priority tier I, II, or III, respectively. The popup menu for the actions button 448 in one or more embodiments can include an "Assign Exclusive Tier" menu item.

In one or more embodiments, the popup menu from the actions button 448 includes an "Invite To Interview" menu item, which causes the multi-program scheduling platform 100 to send an invite to all of the schedulees 1-*m* who are currently selected in the table 420. An invite can take the form of an email or other message to the corresponding schedulee 1-*m*. The email can include a token that links to a schedulee account on the multi-program scheduling platform 100 including a corresponding schedulee calendar 1-*m*. In one or more embodiments, the tokens linked to the schedulees 1-*m* are associated with an American Association of Medical Colleges (AAMC) ID number so that the schedulees 1-*m* can be uniquely identified in the multi-program scheduling platform 100.

In one or more embodiments, the popup menu from the actions button 448 includes a "Send Email" menu item, which causes the multi-program scheduling platform 100 to send an email to all of the schedulees 1-*m* who are currently selected in the table 420. In one or more embodiments, the popup menu from the actions button 448 includes a "Print" menu item for printing the currently selected rows of the table 420, e.g. using a printer of the administrator client 120. In one or more embodiments, the popup menu from the actions button 448 includes an "Edit" and a "Delete" menu item that enable the program administrator 1 edit and delete the currently selected rows in the table 420.

The bar graphs 430-432 provide a visual representation of the parameters for the schedulees 1-*m* currently displayed in the table 420. The bar graphs 430-432 can facilitate the process of assigning priority tiers to the schedulees 1-*m*. The bar graphs 430-432 can facilitate the process of sending invites to the schedulees 1-*m*. The bar graphs 430-432 can facilitate tracking the progress the entire scheduling process.

The bar graphs 430-432 can depict any of the parameters contained in the table 420. In this example, the bar graphs 430 indicate the number of males in the current view of the table 420, the number of females in the current view of the table 420, and the number of the schedulees 1-*m* in the current view of the table 420 who are currently selected. The bar graphs 431 indicate the number of the schedulees 1-*m* in the current view of the table 420 who have been sent invitations, the number who have scheduled, and the number who have been interviewed. The bar graphs 432 indicate the number of schedulees 1-*m* in the current view of the table 420 who have been assigned priority Tier I, priority Tier II, and priority Tier III, or who have not been assigned a priority tier.

Figure 6:
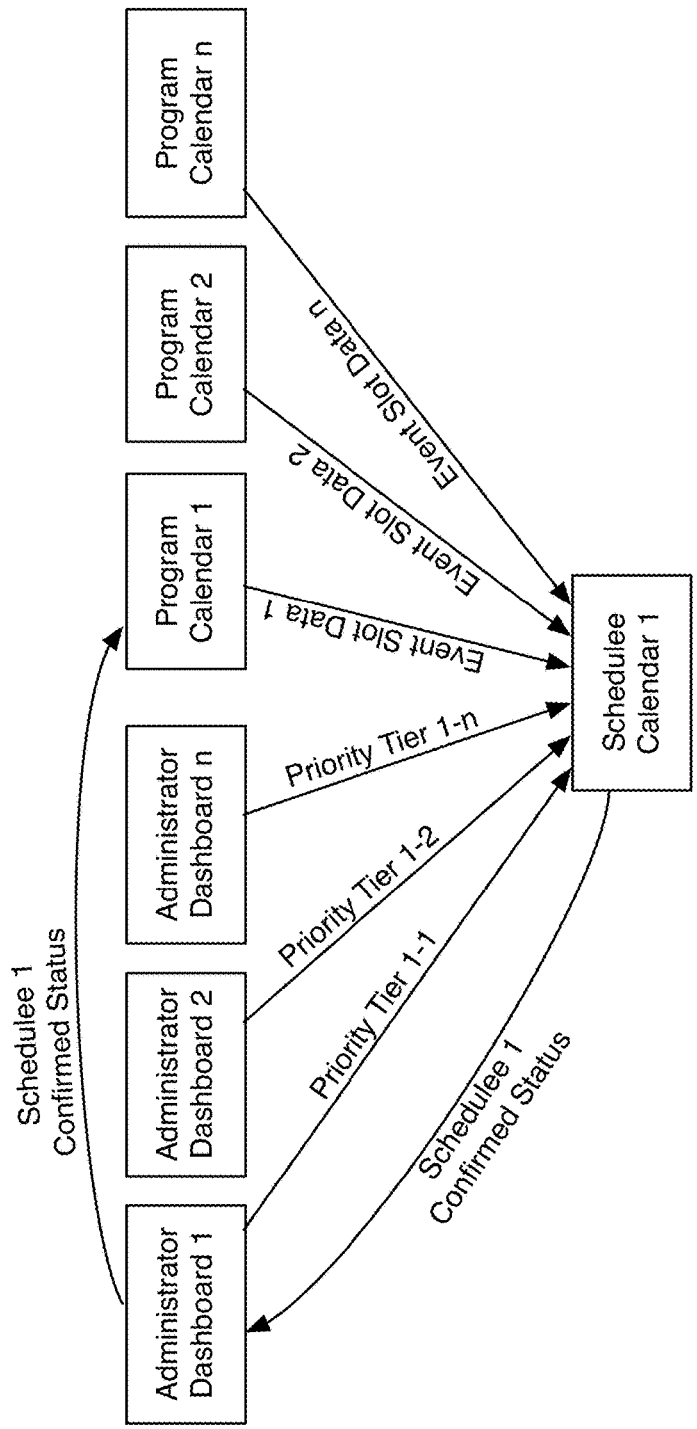
FIG. 6 depicts information sharing among a set of program calendars and administrator dashboards and a schedulee calendar in one or more embodiments.

FIG. 6 depicts information sharing among the program calendars 1-*n* and administrator dashboards 1-*n* and the schedulee calendar 1 in one or more embodiments. Information sharing among the program calendars 1-*n* and administrator dashboards 1-*n* and the schedulee calendars 2-*m*, respectively, can be substantially similar.

The schedulee calendar 1 obtains respective sets of event slot data 1-*n* from the program calendars 1-*n*. Each set of event slot data 1-*n* includes date/time information for each of a set of events in the respective program calendar 1-*n* along with the number of event slots allocated to each of the priority tiers. For example, the event slot data 1 specifies 7 Tier I slots, 3 Tier II slots, and 5 Tier III slots, for the interview day of 2/11/2015 created by the program administrator 1 as depicted in FIG. 3.

The schedulee calendar 1 obtains respective priority tiers 1-1 through 1-*n* from the administrator dashboards 1-*n*. Each priority tier 1-1 through 1-*n* is the priority tier for the corresponding schedulee 1-*m* specified in the corresponding administrator dashboard 1-*n*. For example, the priority tier 1-1 is the priority tier assigned to the schedulee 1 by the program administrator 1 via the table 420 in the administrator dashboard 1 and the priority tier 1-2 is the priority tier assigned to the schedulee 1 by the program administrator 2 via the administrator dashboard 2.

The schedulee calendar 1 compares the priority tiers information specified in the event slot data 1-*n* to the priority tiers 1-1 through 1-*n* to determine which of the event slots specified in the event slot data 1-*n* will be available to the schedulee 1 in the schedulee calendar 1. For example, if the schedulee 1 is John Thalamus listed in the table 420 (FIG. 4) then the priority tier 1-1 specifies a priority tier=II and so the schedulee calendar 1 allows John Thalamus to schedule only the event slots in the event slot data 1 assigned to priority tiers II or III. John Thalamus will not be allowed to schedule any of the tier I slots specified in the event slot data 1.

The schedulee calendar 1 provides a schedulee 1 confirmed status back to the administrator dashboard 1 and the program calendar 1 when the schedulee 1 schedules and confirms an event slot specified in the event slot data 1. The administrator dashboard 1 updates the table 420 and the program calendar 1 updates its view in response to the schedulee 1 confirmed status.

FIG. 7 illustrates the schedulee calendar 1 in one or more embodiments. The schedulee calendars 2-*n* may be implemented in a substantially similar manner. The schedulee 1 can navigate to the schedulee calendar 1 by selecting a "Calendar" button in a navigation pane 710 displayed on the schedulee client 130. The navigation pane 710 can be displayed in the login account of the schedulee 1 on the multi-program scheduling platform 100.

The schedulee calendar 1 in this example displays the NYU Medical School Anesthesiology events on the 11th and 18th of February 2015 because the schedulee 1, John Thalamus, listed in the table 420 has been sent an invite for the corresponding event program. The schedulee calendar 1 in this example also displays events for similar event programs at Loyola University and Univ. of Rochester because John Thalamus has also been sent invites for those event programs in the corresponding administrator dashboards 2-*n*.

In this example, John Thalamus can use his corresponding schedulee client 130-132 to select, e.g., click on 2/11/2015 in the schedulee calendar 1. In response a popup window can appear to allow John Thalamus to confirm that day. The schedulee calendar 1 allows John Thalamus to schedule that day because he is assigned Tier II and Tier II event slots are still available. If all Tier II slots are taken when John Thalamus selects 2/11/2015 then the schedulee calendar 1 will allow John Thalamus to schedule one of the Tier III slots if still available.

Figure 8:
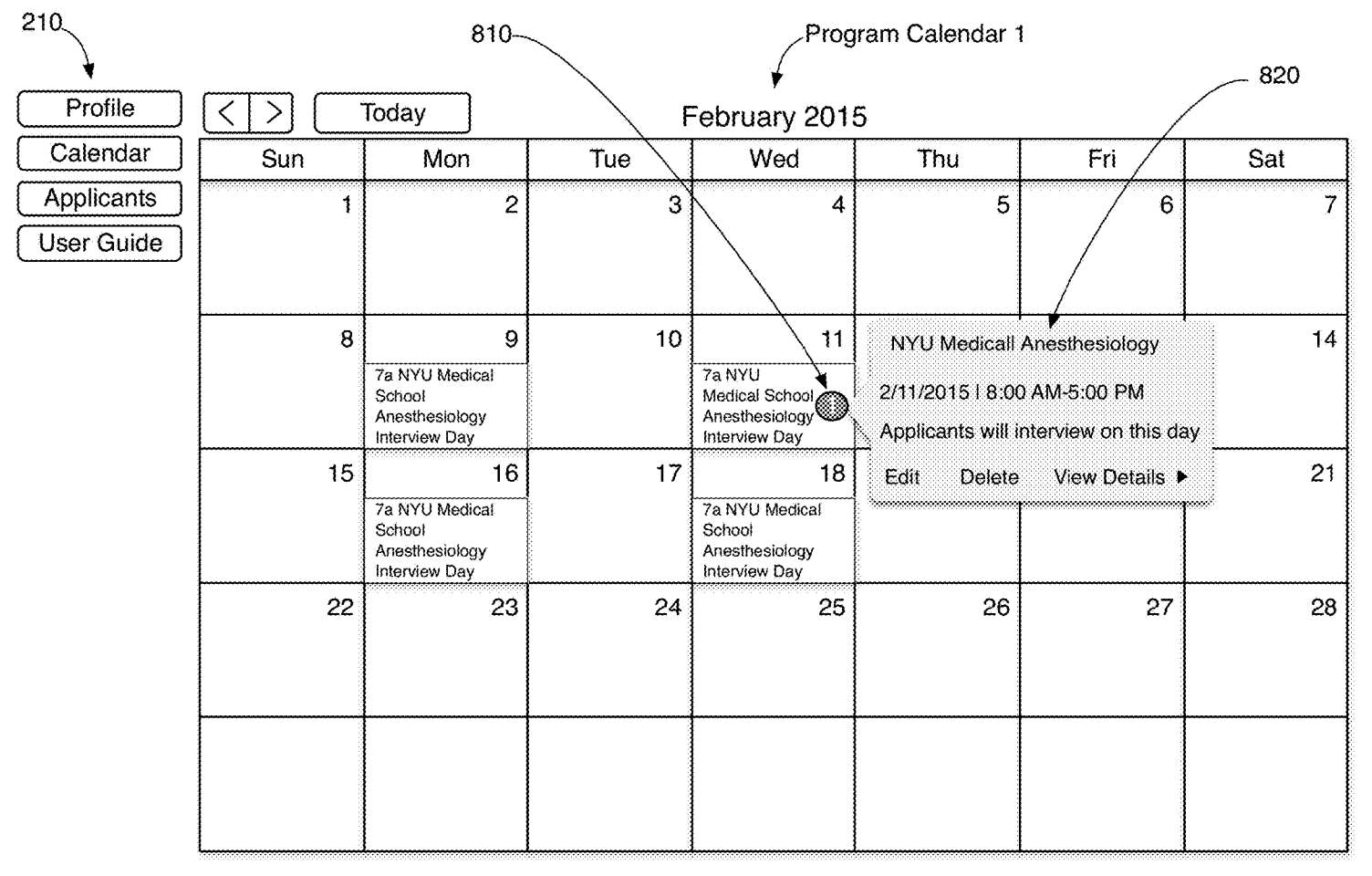

FIG. 8 shows an updated program calendar 1 in response to schedulee 1 confirmed status from the schedulee calendar 1. In this example, the schedulee 1 confirmed status indicates that the schedulee 1, John Thalamus, has confirmed an event slot in the NYU Medical School Anesthesiology event on the 11th of February 2015. In response, the program calendar 1 displays an indicator 810 on that day which indicates to the program administrator 1 that "1" interview slot has been confirmed for that day. If one or more interview slots had previously been confirmed for that day then the number in the indicator 810 is incremented by one in response to the schedulee 1 confirmed status. The program administrator 1 can select the indicator 810 and a popup view 820 appears. The program administrator 1 can select a "View Details" button in the popup view 820 for additional details.

FIG. 9 shows a view 900 displayed when the program administrator 1 selects "View Details" in the popup view 820. The view 900 includes an "Applicants Signed Up"

section that summarizes the schedulees 1-*m* signed up for each of the tiers I, II, and III for the corresponding event. The program administrator 1 can select links, e.g. the John Thalamus link, to navigate to a page in the multi-program scheduling platform 100 that provides additional information for that schedulee 1-*m*. The view 900 includes a "Distribution" section that provides bar graphs depicting parameters associated with the schedulees 1-*m* who have signed up, i.e., confirmed, for the corresponding event.

Figure 10:
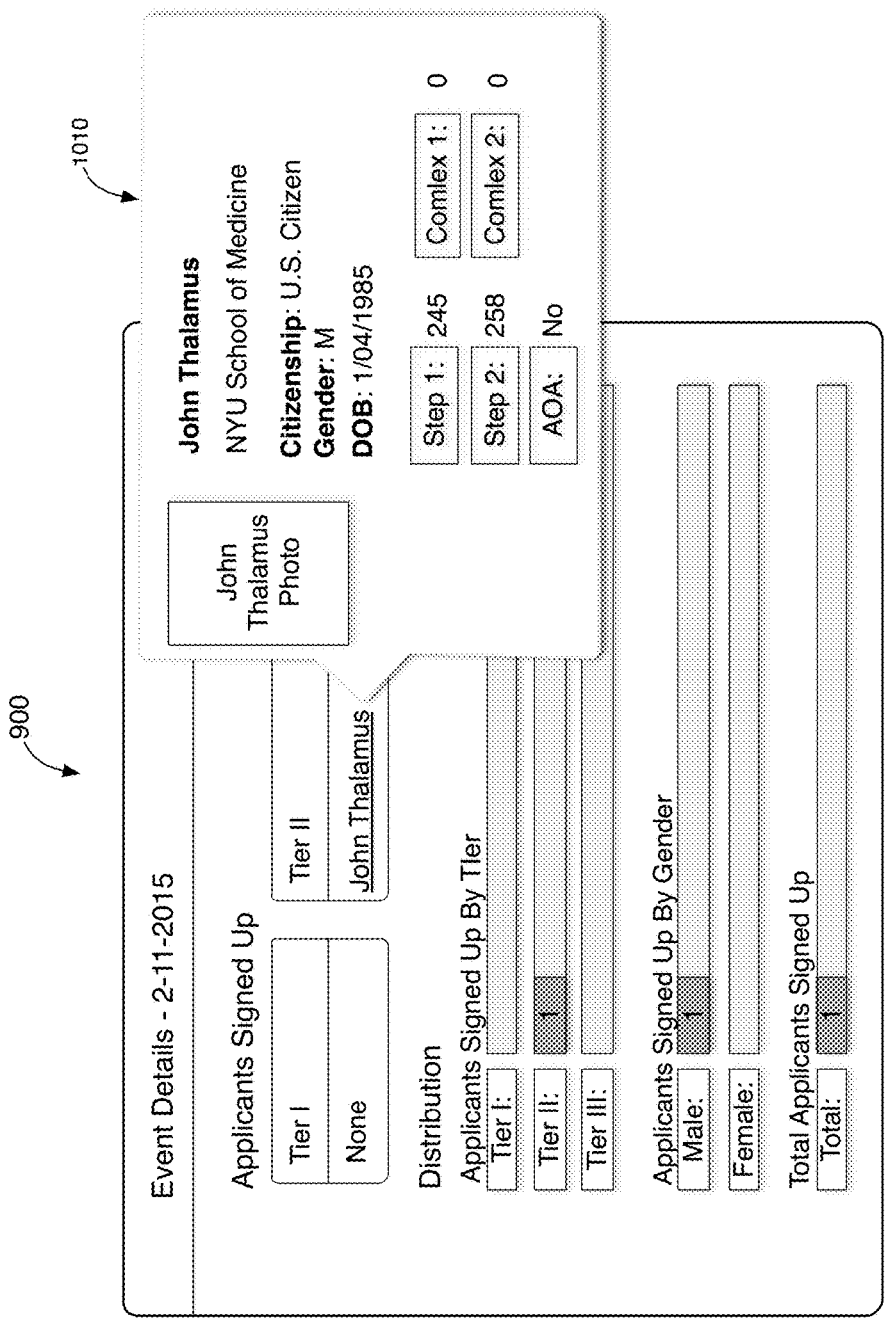
FIG. 10 shows a "baseball card" view displayed when a program administrator selects a schedulee link under event details in one or more embodiments.

FIG. 10 shows a "baseball card" view 1010 displayed over the view 900 when the program administrator 1 selects the John Thalamus link under Tier II in the view 900 in one or more embodiments. The view 1010 provides a picture of the schedulee John Thalamus along with a set of parameters pertaining to John Thalamus.

Figure 11:
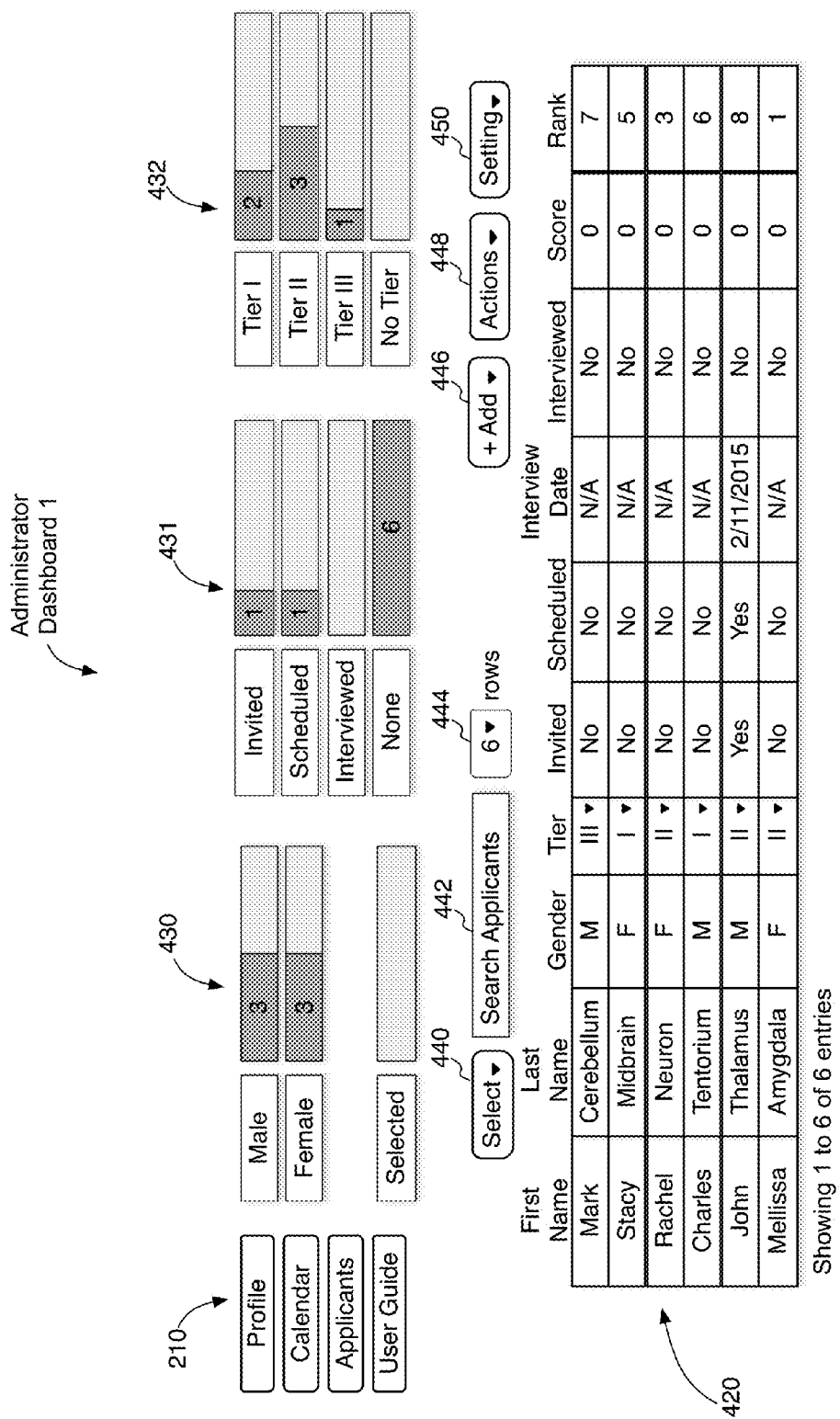
FIG. 11 shows an updated administrator dashboard in response to a schedulee confirmed status from a schedulee calendar.

FIG. 11 shows an updated administrator dashboard 1 in response to schedulee 1 confirmed status from the schedulee calendar 1. The Scheduled and Interview Date columns of the table 420 corresponding to the John Thalamus row now reflect his confirmed interview slot on the 11th of February 2015. In addition, the bar graphs 431 reflect the new confirmed status.

The event programs presided over by the program administrators 1-*n* can be similar programs timed to a particular "season". For example, a particular time of the year can be, by tradition or necessity, the time when medical students apply to residency programs, or the time when students apply for internships, or the time when college students apply to graduate schools, or the time when new graduates seek jobs in corporations or in government. The multi-program scheduling platform 100 can provide centralized scheduling, a one stop shop, for large numbers of schedulees 1-*m* located anywhere in the world. The multi-program scheduling platform 100 can provide the program administrators 1-*n* the ability to select schedulees, and to organize and manage their schedulees, and to monitor the progress scheduling process, and to modify the process based on the status feedback from the schedulees.

FIG. 12 illustrates the print function available to the program administrator 1 via the actions button 448 in the administrator dashboard 1. The print function prints a summary of each schedulee 1-*m* currently selected in the table 420. In this example, summaries for Sally Amygdala and Mark Cerebellum are illustrated. The print function can include a dialog box that enables the program administrator 1 to select, e.g., via checkboxes, which of the parameters from the table 420 are to be included in a print.

Figure 13:
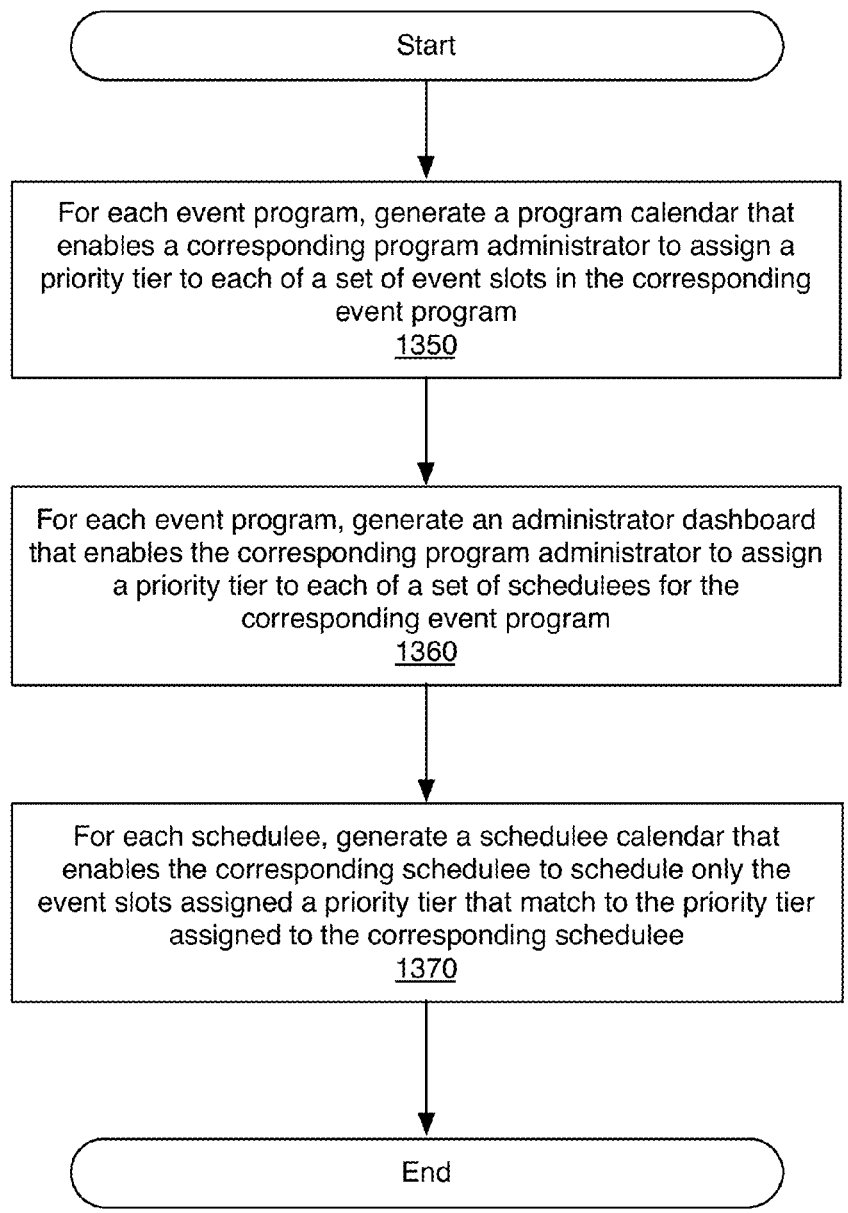
FIG. 13 illustrates a method for scheduling a plurality of event programs in one or more embodiments.

FIG. 13 illustrates a method for scheduling a plurality of event programs in one or more embodiments. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 13 should not be construed as limiting the scope of the invention.

At step 1350, for each event program, a program calendar is generated that enables a corresponding program administrator to assign a priority tier to each of a set of event slots in the corresponding event program. At step 1360, for each event program, an administrator dashboard is generated that enables the corresponding program administrator to assign a priority tier to each of a set of schedulees for the corresponding event program. At step 1370, for each schedulee, a schedulee calendar is generated that enables the corresponding schedulee to schedule only the event slots assigned a priority tier that match to the priority tier assigned to the corresponding schedulee.

The program calendars 1-*n* and the administrator dashboards 1-*n* and the schedulee calendars 1-*m* can be generated on computing systems, e.g., servers, using web protocols so that they can be accessed and displayed on client devices using web browsers. The program calendars 1-*n* and the administrator dashboards 1-*n* and the schedulee calendars 1-*m* can be displayed on client devices running a mobile app adapted to a mobile operating system of the client devices 130-132. The program calendars 1-*n* and the administrator dashboards 1-*n* and the schedulee calendars 1-*m* can be generated using any combination of web protocols and mobile apps.

Embodiments of the invention may be implemented on a specialized computer system. Examples of such a computing system can include one or more mobile devices (e.g., laptop computer, smart phone, personal digital assistant, tablet computer, or other mobile device, game console), desktop computers, servers, blades in a server chassis, or any other type of computing device(s) that include at least the minimum processing power, memory, and input and output device(s) to perform one or more embodiments of the invention.

Figure 14:
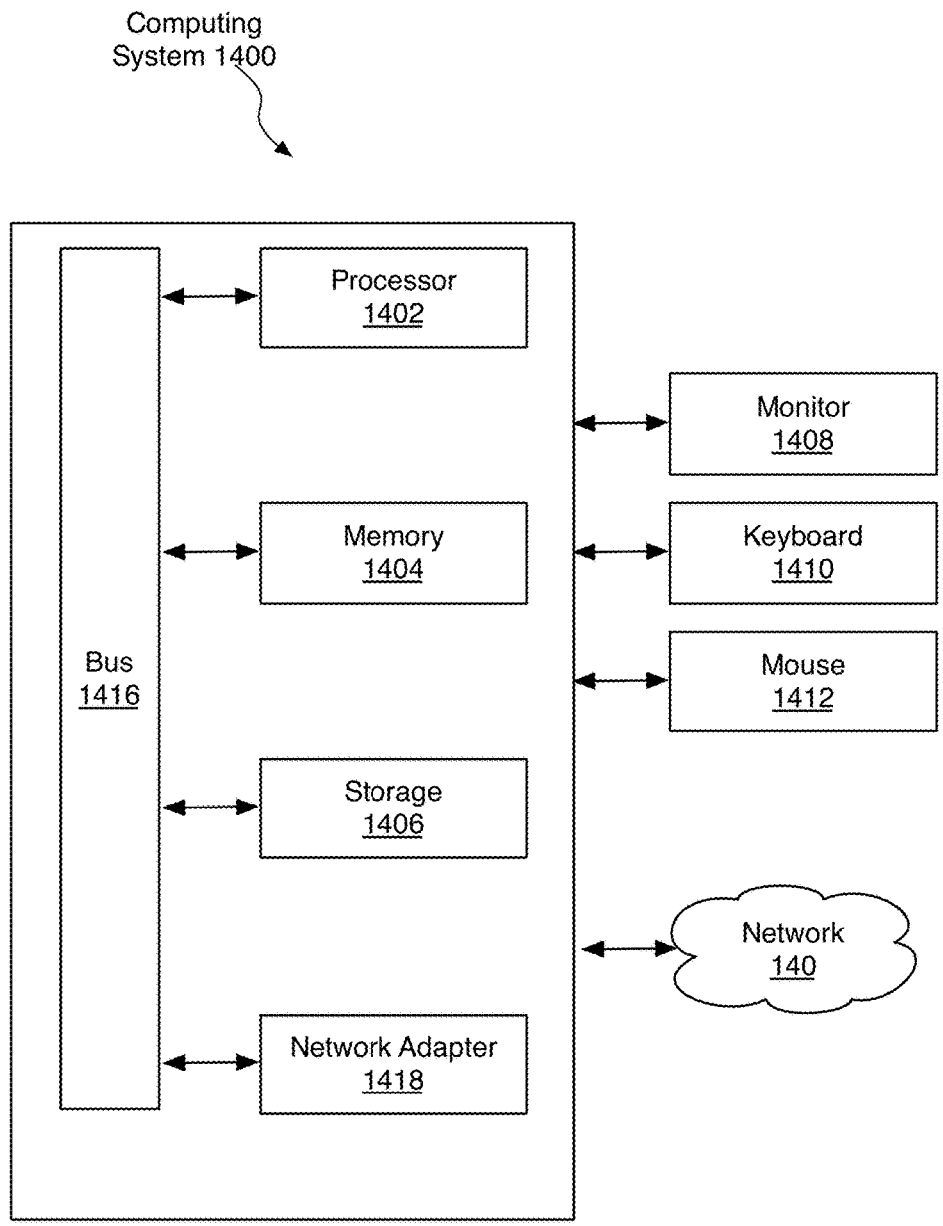
FIG. 14 illustrates a computing system upon which portions of a multi-program scheduling platform can be implemented.

FIG. 14 illustrates a computing system 1400 upon which portions of the multi-program scheduling platform 100 can be implemented. The program calendar module 150, the dashboard module 152, and the schedulee calendar module 154 along with associated login accounts and data structures and logic can be implemented in code running on the computing system 1400. The administrator clients 120-122 and the schedulee clients 130-132 can be implemented in code on similar mobile or desktop/laptop computing systems.

The computing system 1400 includes one or more computer processor(s) 1402, associated memory 1404 (e.g., random access memory (RAM), cache memory, flash memory, etc.), one or more storage device(s) 1406 (e.g., a hard disk, an optical drive such as a compact disk (CD) drive or digital versatile disk (DVD) drive, a flash memory stick, etc.), a bus 1416, and numerous other elements and functionalities. The computer processor(s) 1402 may be an integrated circuit for processing instructions. For example, the computer processor(s) may be one or more cores or micro-cores of a processor. The computing system 1400 may also include one or more input device(s), e.g., a touchscreen, keyboard 1410, mouse 1412, microphone, touchpad, electronic pen, or any other type of input device. Further, the computing system 1400 may include one or more monitor device(s) 1408, such as a screen (e.g., a liquid crystal display (LCD), a plasma display, touchscreen, cathode ray tube (CRT) monitor, projector, or other display device), external storage, input for an electric instrument, or any other output device. The computing system 1400 may be connected to the network 140 (e.g., a local area network (LAN), a wide area network (WAN) such as the Internet, mobile network, or any other type of network) via a network adapter 1418.

While the foregoing disclosure sets forth various embodiments using specific diagrams, flowcharts, and examples, each diagram component, flowchart step, operation, and/or component described and/or illustrated herein may be implemented, individually and/or collectively, using a range of processes and components.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While the invention has been described with respect to a limited number of embodiments, those skilled in the art, having benefit of this disclosure, will appreciate that other embodiments may be devised which do not depart from the scope of the invention as disclosed herein.

What is claimed is:

1. A scheduling platform for a plurality of event programs, comprising:

computing means configured to generate a user interface on a client device of a respective program administrator of each event program such that the user interfaces enable each program administrator to select a respective priority tier for each of a set of event slots in the respective event program from among a set of predetermined priority tiers depicted in the respective user interface;

computing means configured to generate an administrator dashboard on each client device such that the administrator dashboards enable each program administrator to select a respective view of a set of parameters pertaining to a set of schedulees registered with the scheduling platform and to select a respective priority tier for each schedulee depicted in the respected view from among the predetermined priority tiers wherein each view includes a table having a set of rows each depicting the parameters for one of the respective schedulees and each table enables the respective program administrator to sort the respective schedulees by one or more of the respective parameters and to individually select the rows and select one of the predetermined priority tiers for assignment to a currently selected row in the respective table and each view includes a set of bar graphs each visually depicting the parameters in a corresponding column of the respective table; and computing means configured to generate a respective schedulee calendar for each schedulee and to merge at least one of the event slots in more than one of the event programs into at least one of the schedulee calendars in response to the priority tiers of the event slots and the priority tiers of the schedulees such that, for each event slot, each schedulee calendar allows the respective schedulee to schedule the event slot only if the priority tier assigned to the event slot by the respective program administrator of the event slot matches the priority tier assigned to the respective schedulee by the respective program administrator of the event slot.

2. The scheduling platform of claim 1, wherein the predetermined priority tiers include an exclusive tier such that, for each event slot, each schedulee calendar allows the respective schedulee to schedule the event slot only if the event slot is assigned the exclusive tier by the respective program administrator of the event slot and the respective schedulee is assigned the exclusive tier by the respective program administrator of the event slot.

3. The scheduling platform of claim 1, wherein each table enables the respective program administrator to select a plurality of the rows of the table and select one of the predetermined priority tiers for assignment to a set of currently selected rows in the table in a batch mode.

4. The scheduling platform of claim 1, wherein each table enables the respective program administrator to individually select the rows of the table and send an invite to the schedulee depicted in a currently selected row in the table.

5. The scheduling platform of claim 1, wherein each table enables the respective program administrator to select a plurality of the rows of the table and send a respective invite to each schedulee depicted in a set of currently selected rows in the table in a batch mode.

6. The scheduling platform of claim 1, wherein the bar graphs visually depict a set of demographic information pertaining to the schedulees depicted in the respective table.

7. The scheduling platform of claim 1, wherein the bar graphs visually depict the priority tiers currently assigned to the schedulees depicted in the respective table.

8. A method for scheduling a plurality of event programs via a scheduling platform, comprising:

generating a user interface on a client device of a respective program administrator of each event program such that the user interfaces enable each program administrator to select a respective priority tier for each of a set of event slots in the respective event program from among a set of predetermined priority tiers depicted in the respective user interface;

generating an administrator dashboard on each client device such that the administrator dashboards enable each program administrator to select a respective view of a set of parameters pertaining to a set of schedulees registered with the scheduling platform and to select a respective priority tier for each schedulee depicted in the respected view from among the predetermined priority tiers wherein each view includes a respective table having a set of rows each depicting the parameters for one of the respective schedulees and each table enables the respective program administrator to sort the respective schedulees by one or more of the respective parameters and to individually select the respective rows and select one of the predetermined priority tiers for assignment to a currently selected row in the respective table and each view includes a set of bar graphs each visually depicting the parameters in a corresponding column of the respective table; and generating a respective schedulee calendar for each schedulee by merging at least one of the event slots in more than one of the event programs into at least one of the schedulee calendars in response to the priority tiers of the event slots and the priority tiers of the schedulees such that, for each event slot, each schedulee calendar allows the respective schedulee to schedule the event slot only if the priority tier assigned to the event slot by the respective program administrator of the event slot matches the priority tier assigned to the respective schedulee by the respective program administrator of the event slot.

9. The method of claim 8, wherein generating a respective schedulee calendar comprises generating the schedulee calendars such that, for each event slot, each schedulee calendar allows the respective schedulee to schedule the event slot only if the event slot is assigned an exclusive tier by the respective program administrator of the event slot and the respective schedulee is assigned the exclusive tier by the respective program administrator of the event slot.

10. The method of claim 8, wherein each table enables the respective program administrator to select a plurality of the rows of the table and select one of the predetermined priority tiers for assignment to a set of currently selected rows in the respective table in a batch mode.

11. The method of claim 8, wherein each table enables the respective program administrator to individually select the rows of the table and send an invite to the schedulee depicted in a currently selected row in the respective table.

12. The method of claim 8, wherein each table enables the respective program administrator to select a plurality of the rows of the table and send a respective invite to each schedulee depicted in a set of currently selected rows in the respective table in a batch mode.

13. The method of claim 8, wherein the bar graphs depict a set of demographic information pertaining to the schedulees depicted in the respective table.

14. The method of claim 8, wherein the bar graphs depict the priority tiers currently assigned to the schedulees depicted in the respective table.

* * * * *